(12) United States Patent
Knobel

(10) Patent No.: US 8,348,590 B2
(45) Date of Patent: Jan. 8, 2013

(54) DEVICE FOR TREATING AND/OR HANDLING ARTICLES

(75) Inventor: Guido Knobel, Warth (CH)

(73) Assignee: KMB Produktions AG, Felben (CH)

( * ) Notice: Subject to any disclaimer, the term of this patent is extended or adjusted under 35 U.S.C. 154(b) by 715 days.

(21) Appl. No.: 12/377,639

(22) PCT Filed: Aug. 16, 2007

(86) PCT No.: PCT/EP2007/007238
§ 371 (c)(1),
(2), (4) Date: Nov. 5, 2009

(87) PCT Pub. No.: WO2008/019850
PCT Pub. Date: Feb. 21, 2008

(65) Prior Publication Data
US 2010/0047051 A1    Feb. 25, 2010

(30) Foreign Application Priority Data

Aug. 16, 2006 (DE) .................... 10 2006 038 505

(51) Int. Cl.
*B25J 5/00*      (2006.01)

(52) U.S. Cl. ............. 414/729; 74/490.01; 901/15
(58) Field of Classification Search ............ 414/735, 414/680, 917, 729; 74/469, 490.01; 901/15
See application file for complete search history.

(56) References Cited

U.S. PATENT DOCUMENTS 6,428,267 B1    8/2002    Terpstra
6,557,235 B1    5/2003    Katz et al.

FOREIGN PATENT DOCUMENTS

| DE | 29622288 | 2/1997 |
| DE | 19654041 | 6/1998 |
| DE | 29820564 | 5/1999 |
| DE | 29920995 | 5/2000 |
| DE | 102005047819 | 5/2006 |
| WO | 9908832 | 2/1999 |
| WO | 9932256 | 7/1999 |

*Primary Examiner* — Donald Underwood
(74) *Attorney, Agent, or Firm* — Bachman & LaPointe, P.C.

(57) ABSTRACT

A device for treating and/or handling articles (10), especially molds in the production of chocolate articles, comprises a gripper (6) that is arranged on arms (3.1-3.5) which can be displaced along a rail (1) on carriages (2.1-2.4). At least three arms (3.1 to 3.4) are connected to the gripper (6), every arm having its own joint (6, 7, 29) on the gripper (6) which joint is independent of the other arm.

8 Claims, 11 Drawing Sheets

DEVICE FOR TREATING AND/OR HANDLING ARTICLES

BACKGROUND OF THE INVENTION

The present invention relates to a device for treating and/or handling objects, in particular of molds for the production of chocolate articles, by means of a gripper which is arranged on at least three arms which can each be moved along at least one rail on two outer carriages and one inner carriage, with an outer arm on the outer carriage crossing an inner arm on the inner carriage.

Devices of the abovementioned type are known and are commercially available in many forms and embodiments. In general, they are referred to as robots and are used to move objects of any type from one point to another desired point during automated operation. Just by way of example, reference is made to DE 299 20 995 U1, which discloses a device for manipulation of printed circuit boards. In this case, a handling device with suction elements on a plate is located in a base housing, with the handling device taking printed circuit boards out of a cassette with an inclined positioning wall, or unstacking them in a corresponding cassette. The handling device has a hydraulic cylinder from which a piston rod can be extended, on which the plate with the suction elements is arranged. This cylinder rotates about an axis, and the picking up and insertion activity is achieved by extension of the piston rod.

In a similar manner, DE 296 22 288 U1 also discloses where printed circuit boards and adhesive layers (prepregs) are joined together in a device. This is done by appropriate suction plates on carriages which are guided on rails.

U.S. Pat. No. 6,557,235 B1 describes a linear robot which is used for treatment or handling tasks. The device comprises a machine frame, a mobile platform and two linear guides. A mobile platform is connected via the connecting elements to the linear guides, with two connecting elements being connected to the platform by means of the same joint. Grippers or tools can be attached to the mobile platform.

Furthermore, WO 99/08832 A1 discloses a device for movement and positioning of an object on a plane. In one exemplary embodiment, the object is connected to a respective carriage via three arms. In this case, the arms of two adjacent carriages form a common joint, or each in its own right forms an adjacent joint, on the object. In a further exemplary embodiment of the invention, an inner arm then crosses an outer arm, with the two outer arms forming a common joint on the tool.

WO 99/32256 A1 discloses a similar subject matter as well, although in this case an outer arm crosses the inner arm.

The present invention relates in particular to the movement of objects in the foodstuffs field, and in this case in the production of confectionery articles, such as chocolates or the like. These confectionery articles are normally produced in a multiple mold, which is then moved to a further treatment station for hardening. Until now, this has been done by means of commercially available robots which operate using hydraulics or pneumatics. In particular, these are subject to hygienic reservations. Furthermore, the speed of such hydraulic robots leaves much to be desired, and the accuracy with which, for example, multiple molds have to be associated with the corresponding output nozzles can be achieved only with difficulty by means of hydraulic or pneumatic robots.

The object of the present invention is to develop a low-cost device of the abovementioned type which can be produced easily and operates extremely precisely.

SUMMARY OF THE INVENTION

In order to achieve the object, an outer arm which crosses an inner arm forms a common joint with a further outer arm on the gripper, or else crosses the further outer arm and forms its own joint with the gripper beyond the joint.

This arrangement provides the guidance for the gripper with considerable robustness, thus considerably improving the guidance precision. Furthermore, this makes it possible for the gripper not only to be raised or lowered, but also to be pivoted. The gripper can therefore be used in a highly versatile manner.

In the case of both the first and the second exemplary embodiment, it may be considered to be advisable for two arms to form a parallelogram, that is to say to be arranged on the same side offset with respect to the gripper. The third arm, on the other side of the gripper, crosses the parallelogram or at least one arm of it. This keeps the width of the overall device as small as possible.

In another exemplary embodiment of the invention, in contrast, the arms do not form a parallelogram but can be moved as required on one or more rails. This allows the gripper to carry out any desired movement about a joint, for example even a 360° rotation.

In another exemplary embodiment, two arms are made shorter, with one shorter arm section belonging to a parallelogram with a longer arm. At their free end, the two short arm sections are connected to a center joint, to which two fixing arm strips, which are connected to the gripper, are also connected. An articulated arm arrangement such as this also allows specific movements of the gripper to be carried out.

The exemplary embodiments which have just been mentioned can be developed as required. Further exemplary embodiments are within the scope of the invention.

Furthermore, it is also feasible that an attachment with a transfer surface, which is positioned obliquely with respect to the gripper surface, is located on the gripper, and this likewise makes it possible to take account of special requirements for gripper movement.

In order to allow a three-dimensional movement of the gripper in space as well, a further rail may also be associated with the abovementioned rail, wherein, preferably, a linear drive is likewise located between the first rail and the second rail. The second rail should run obliquely with respect to the first rail, or even at right angles to it.

The invention also provides for a linear drive to be arranged between the carriages and the rail.

The expression a linear drive or linear motor means an electrical drive machine. In contrast to the widely used rotating machines, a linear motor does not move the objects connected to it in the form of a rotary movement, but in a linear movement (translation movement). One possibility for designing a linear motor is to develop a rotating stepping motor onto a plane. For example, DE 10 2005 047 819 A1 describes a linear motor such as this, to which reference is made, as a result of which the linear motor will not be described any further here.

For the present situation, this means that the linear drive is arranged between the rail and the carriage. For example, corresponding permanent-magnet strips can be arranged as part of a stator on the rail, with these permanent-magnet strips having alternate polarity. The movable part of the linear motor is separated therefrom by an air gap, with this movable part having the corresponding windings which can be energized in order to operate the linear drive. This arrangement may, of course, also be reversed.

Linear motors have considerable advantages. On the one hand, they operate without any gearboxes, thus considerably assisting their handling and their use. They operate without wear, as a result of which they can also be used in particular in clean rooms. A further advantage is that they can be subjected to an extraordinarily high acceleration and nevertheless maintain a predetermined position or a position that has been moved to, extremely precisely.

Particularly because of the enormous acceleration, which, of course, allows processes to be speeded up considerably, the further transport members which are connected to the carriage must be designed such that the objects to be moved, whose weight increases very greatly, in relative terms, during the enormous acceleration, can also be held. For this purpose, provision is made for a further arm to be connected to the gripper, which arm can be moved along a rail on a further carriage. Although protection is also sought for this feature and the following features independently of the linear motor, the essence of the invention is desirable in particular for use of a linear motor or of two linear motors with two carriages. In this way, the gripper is not only suspended on one arm, and would in this case be subject to pendular movements, but it is supported on a second arm, with the two arms and the rail preferably being arranged in a triangular shape with respect to one another. In this case, only the arms need be designed appropriately to withstand compression and tension.

In one preferred exemplary embodiment of the invention, a force store can be arranged between the gripper and carriage. This may be a corresponding hydraulic, pneumatic, electrical or mechanical device, for example a helical spring. This force store is particularly necessary when a linear motor as described above is used. If the electrical power for the machine fails, then there is a risk of the gripper dropping downwards. This is prevented by the force store, as a result of which this force store forms an emergency stop.

The present invention can be used for many purposes as a robot or for treatment of workpieces. It is primarily intended to be used for the production of chocolate articles. In this case, the device is used not only to move, for example, molds, in which chocolate articles are formed, as is described by way of example in EP 0 981 280 A1. In order to move the corresponding mold, the device according to the invention is generally arranged on a ceiling, and works vertically.

However, the device could also, for example, be used to transport the mold further, in a similar manner to DE 298 20 564 U, or else for stripping excess chocolate mass from the mold. In this case, appropriate tools are provided on the gripper. For example, this may be a scraping tool which is lowered by means of the gripper obliquely from above onto the mold and, after the individual mold receptacles have been filled and have cooled down, can strip off the chocolate mass projecting above the mold receptacles. Appropriate sensors then govern the speed and pressure of this process, and the linear drive as mentioned above is once again particularly suitable for this purpose.

BRIEF DESCRIPTION OF THE DRAWINGS

Further advantages, features and details of the invention will become evident from the following description of preferred exemplary embodiments and from the drawing, in which.

DETAILED DESCRIPTION

Figure 1A:
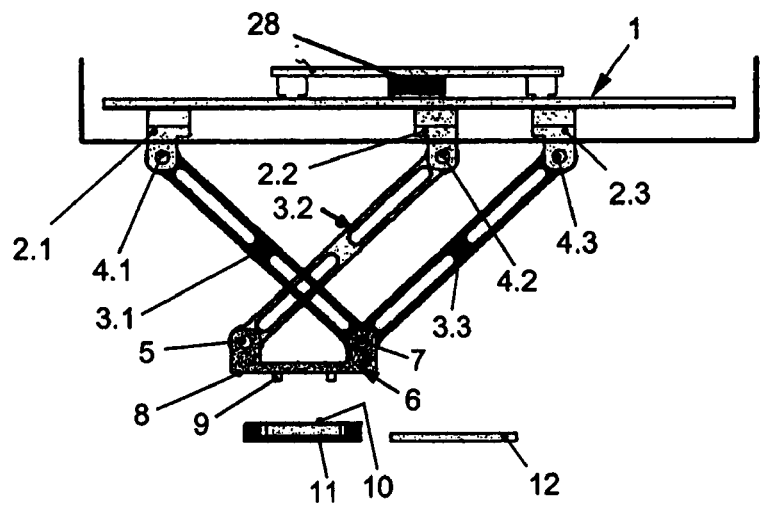
FIGS. 1a to 1f show side views of one exemplary embodiment of a device according to the invention for moving objects in different in-use positions.

According to FIGS. 1a to 1f, three carriages 2.1 to 2.3 are arranged on a rail 1 and can be moved along this rail 1. An arm 3.1 to 3.3 is connected via a joint 4.1 to 4.3 to each carriage 2.1 to 2.3. At its free end, the arm 3.2 is connected via a further joint 5 to a gripper 6, while the two other arms 3.1 and 3.3 have a common joint 7 on the gripper 6. Gripping members 9, for example suction cups, are located on a gripper surface 8 and can hold an object 10 that is to be moved. This object 10 is located in a container 11 and is intended to be moved onto a supporting surface 12, for example a conveyor belt.

Figure 1B:
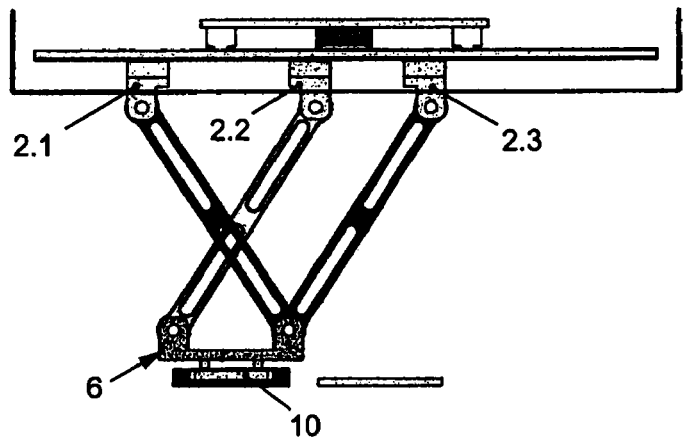
Figure 1C:
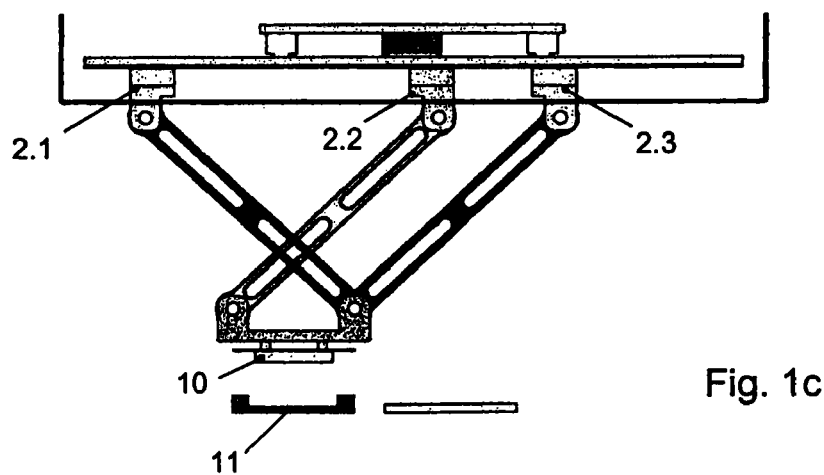

The method of operation of the present invention is as follows:

As shown in FIG. 1a, the gripper 6 is arranged above the container 11 by means of an appropriate movement of the carriages 2.1 to 2.3. In order to lower the gripper 6 exactly vertically onto the object 10 as shown in FIG. 1b, all three carriages 2.1 to 2.3 are moved through the same distance, with the carriages 2.2 and 2.3 following and both running to the carriage 2.1. In order to raise the object 10 exactly vertically out of the container 11, the three carriages 2.1 to 2.3 are once again moved back through the same distance as a result of which, as shown in FIG. 1, they are in the initial position as shown in FIG. 1a.

Figure 1D:
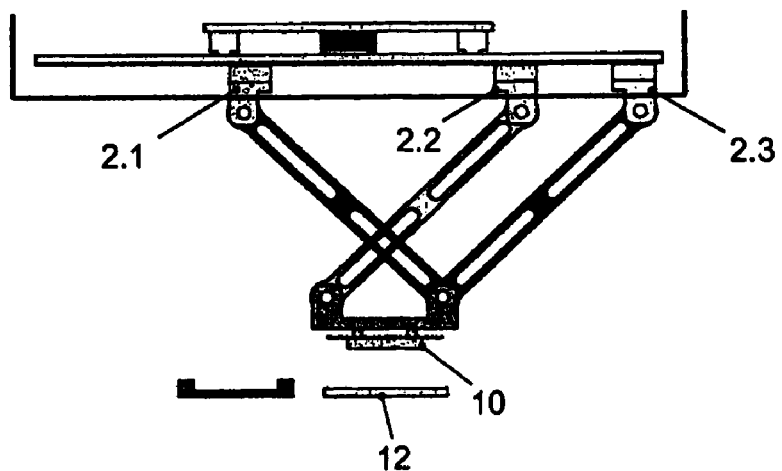
Figure 1E:
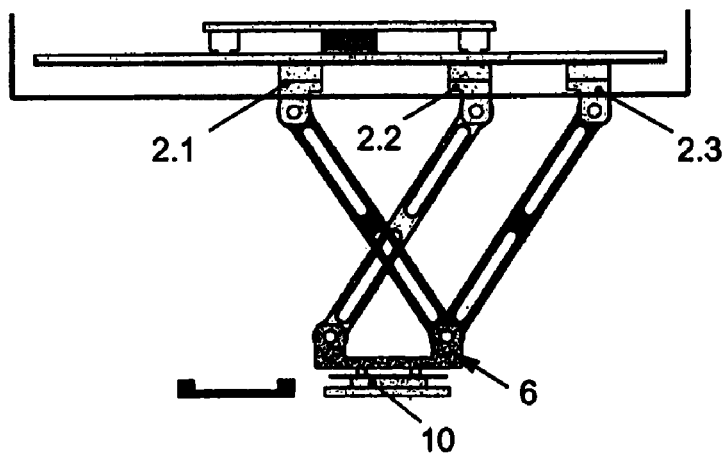

The three carriages 2.1 to 2.3 are now moved through the same distance to the right, as shown in FIG. 1d, until the object 10 is located above the supporting surface 12. All three carriages 2.1 to 2.3 are then once again moved through the same distance, to be precise the carriages 2.2 and 2.3 successively and the carriage 2.1 towards the carriages 2.2 and 2.3. This results in the gripper 6, together with the object 10, being lowered onto the supporting surface 12.

Figure 1F:
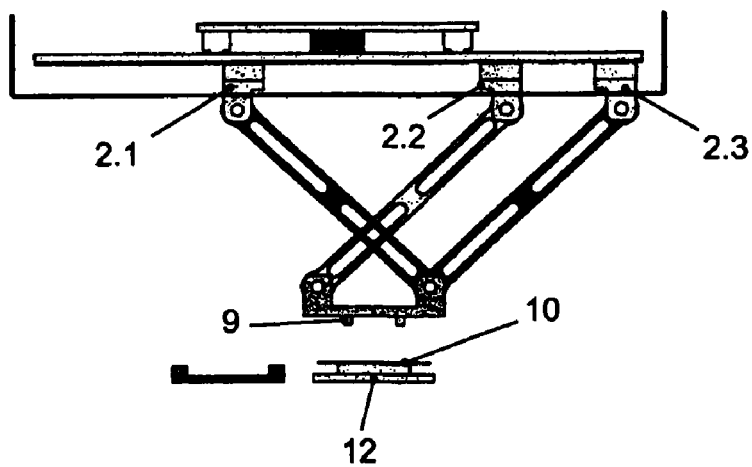
Figure 2A:
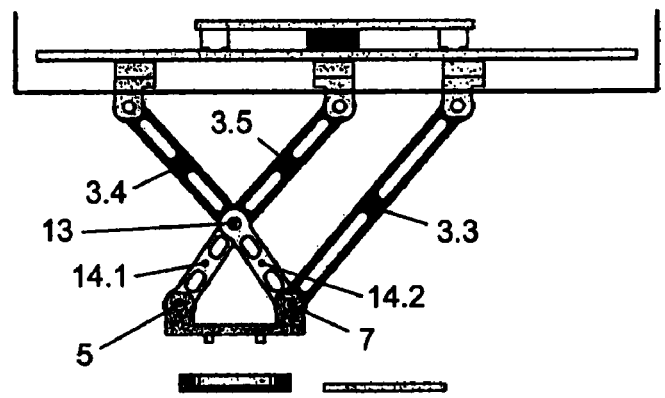
FIGS. 2a to 2f show side views of a further exemplary embodiment of a device according to the invention for moving objects in different in-use positions.
Figure 2B:
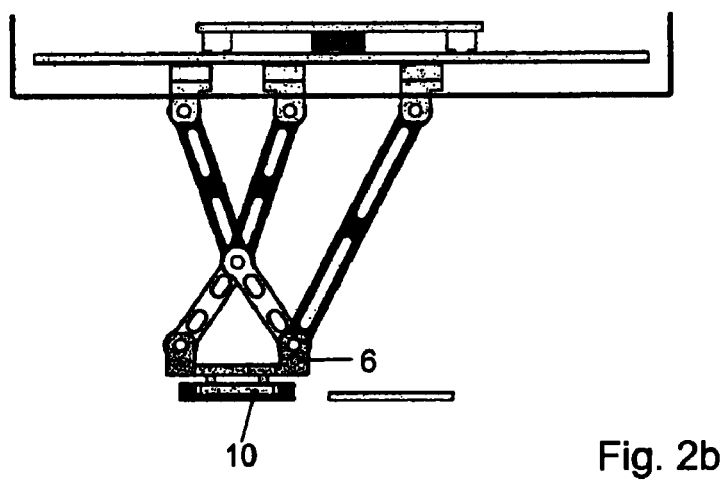
Figure 2C:
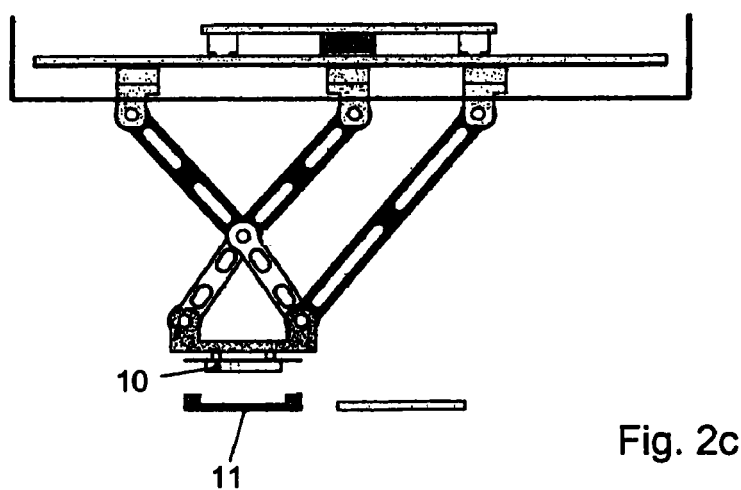
Figure 2D:
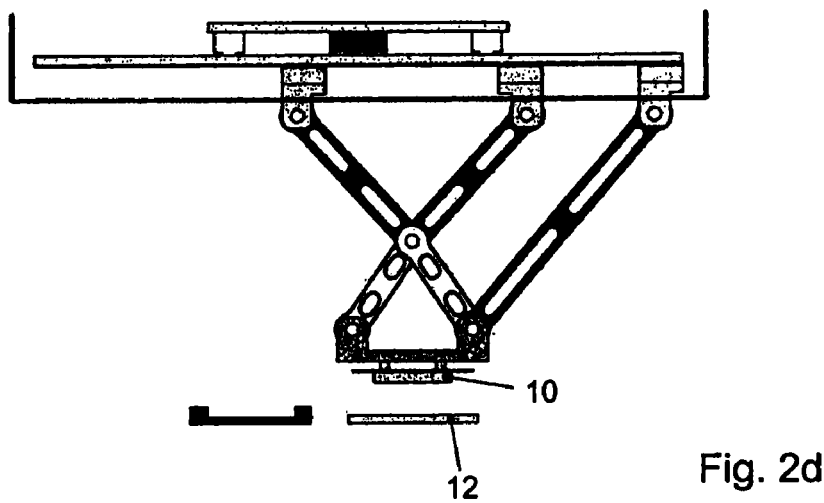
Figure 2E:
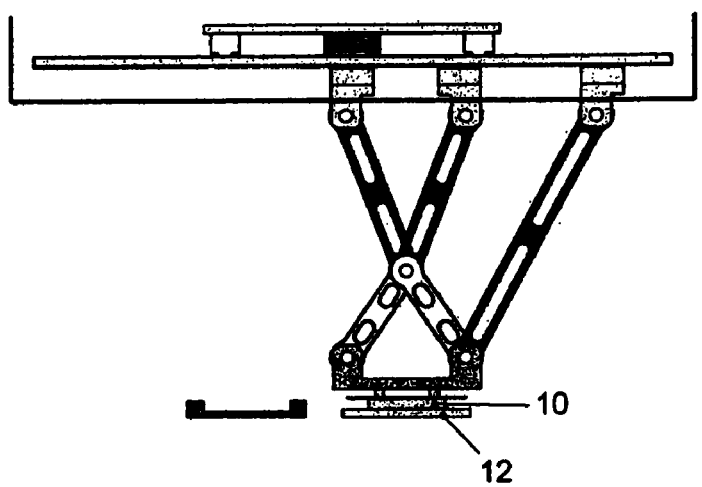
Figure 2F:
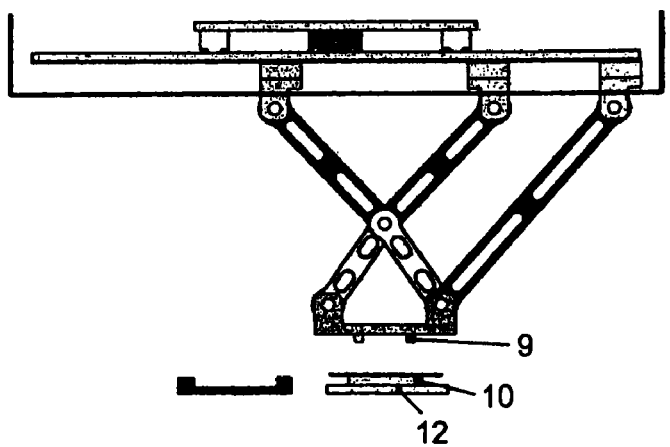

The gripping members 9 are now released and, as shown in FIG. 1f, the carriages 2.1 to 2.3 are moved back to the initial position as shown in FIG. 1d, with the object 10 remaining on the supporting surface 12.

The exemplary embodiment of a device according to the invention for moving objects as shown in FIGS. 2a to 2f differs from that shown in FIGS. 1a to 1f in that two arms 3.4 and 3.5 are shortened and both are coupled via a center joint 13 to two arm strips 14.1 and 14.2, which are connected to the gripper via the joints 5 and 7. On the one hand, this embodiment can be used to carry out the same movement process as that described with reference to FIGS. 1a to 1f. According to FIG. 2b, the gripper 6 is lowered to the object 10, according to FIG. 2c, the object 10 is raised out of the container 11, according to FIG. 2d, the object 10 is transferred to a position above the supporting surface 12, according to FIG. 2e, the object 10 is lowered onto the supporting surface 12 and, according to FIG. 2f, the gripping members 9 are released from the object 10, which remains on the supporting surface 12.

While, with the exemplary embodiment of the device according to the invention for moving objects as shown in FIGS. 1a to 1f, a different movement of the carriages 2.1 to 12.3 admittedly allows the gripper 6 to be tilted to a certain extent, the gripper according to the exemplary embodiment shown in FIGS. 2a to 2f can be pivoted about the center joint 13, as shown in FIGS. 3a to 3f. However, in this case, it is advisable but not necessary for at least one carriage 2.3 to be arranged on a separate rail which, although this is not shown in any more detail, is located behind the rail 1.

Figure 3A:
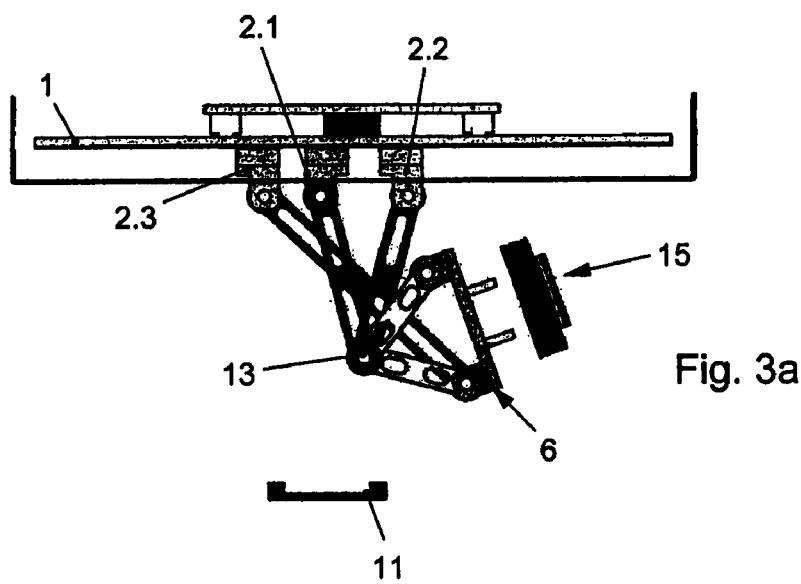
FIGS. 3a to 3f show side views of a further exemplary embodiment of a device according to the invention for moving objects in different in-use positions.
Figure 3B:
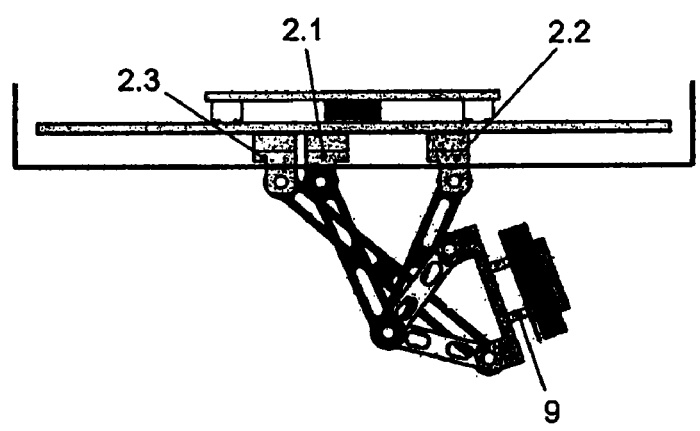
Figure 3C:
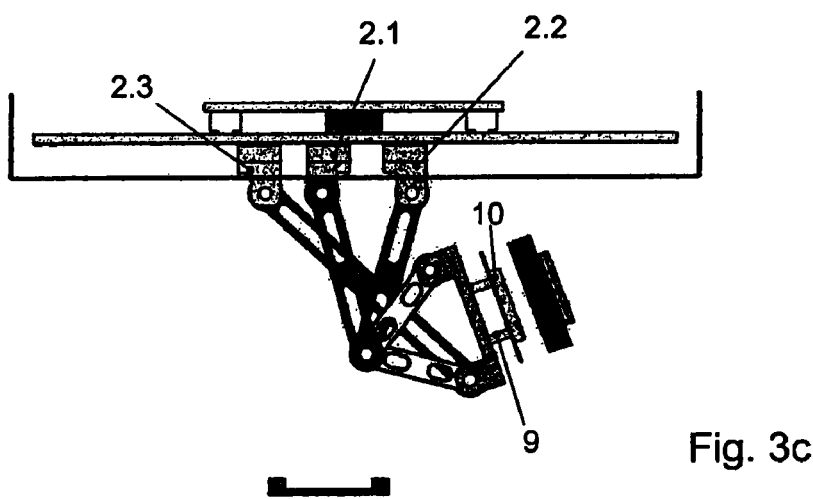

According to FIG. 3a, the carriages 2.1-2.3 are located relatively close to one another. In this case, the gripper 6 has been pivoted through more than 90°, as a result of which it can take an object 10 from a stack 15 which is arranged inclined with respect to the container 11. For this purpose, the two carriages 2.1 and 2.2 are moved somewhat away from one another and all three carriages are moved to the stack 15, with this movement taking place continuously thus resulting in the stack 15 being approached obliquely. In consequence, the gripping members 9 can also grip the object 10 obliquely, as is shown in FIG. 3b. The carriages 2.1 to 2.3 are now moved back to the initial position as shown in FIG. 3a, with the gripping members 9 holding the object 10, as shown in FIG. 3c. The carriages 2.1 to 2.3 are then moved away from one another, as a result of which the gripper 6 is pivoted to the position shown in FIG. 3d, in which the object 10 is located above the container 11.

Figure 3D:
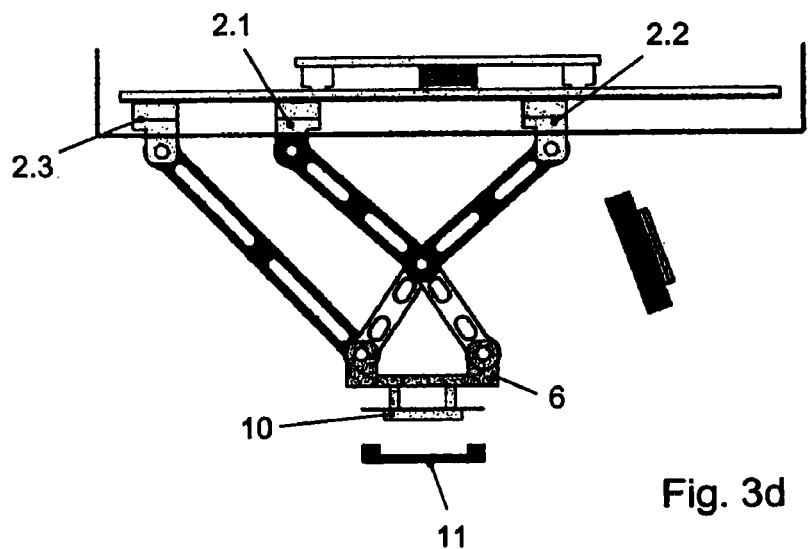
Figure 3E:
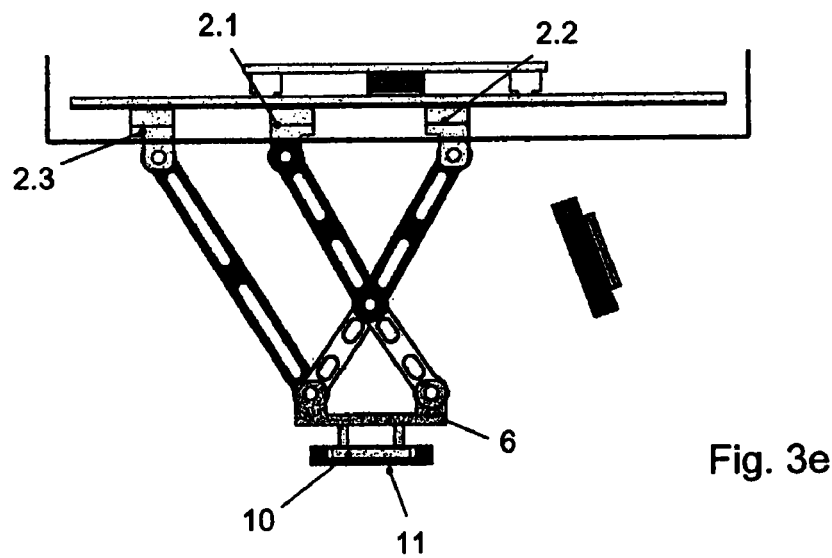
Figure 3F:
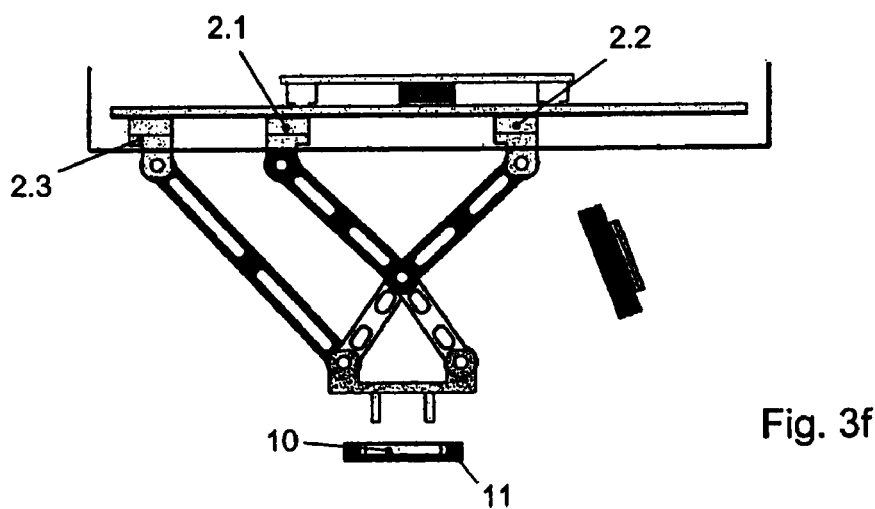

According to FIG. 3e, the two carriages 2.1 are now once again moved towards one another, while the carriage 2.3 follows the carriage 2.1. This results in the gripper 6 being lowered exactly vertically, as a result of which the object 10 can be transferred into the container 11. The carriages 2.1 to 2.3 are then once again moved back to the initial position as shown in FIG. 3d, but with the object 10 remaining in the container 11, as shown in FIG. 3f.

While, in the case of the exemplary embodiment shown in FIGS. 1a to 1f, the carriages 2.1 to 2.3 can be arranged on the same rail 1, they must be arranged on different rails when the aim is to pivot the gripper over a greater pivoting extent, in which case a second rail may be located behind the first rail. In the exemplary embodiment shown in FIGS. 4a to 4f, the carriages 2.1 and 2.3 are located on the same rail 1, while a dedicated rail is provided for the carriage 2.2. In this arrangement, the gripper 6 could even be pivoted through 360° about the joint 5.

Figure 4A:
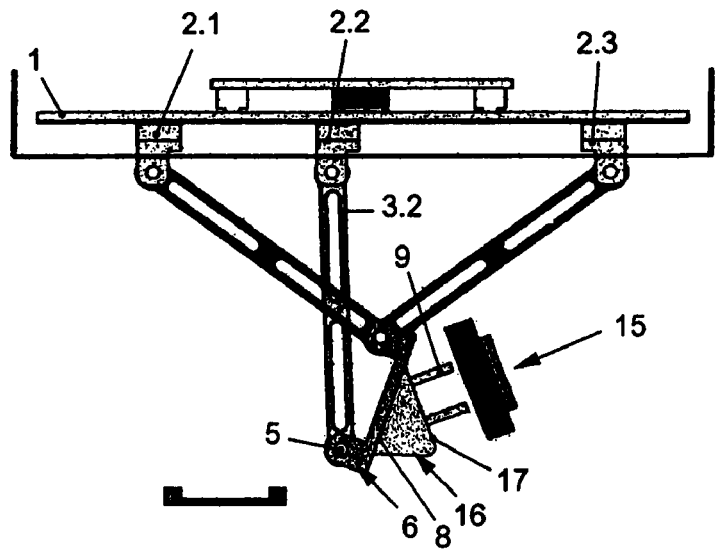
FIGS. 4a to 4f show side views of a further exemplary embodiment of a device according to the invention for moving objects in different in-use positions.
Figure 4B:
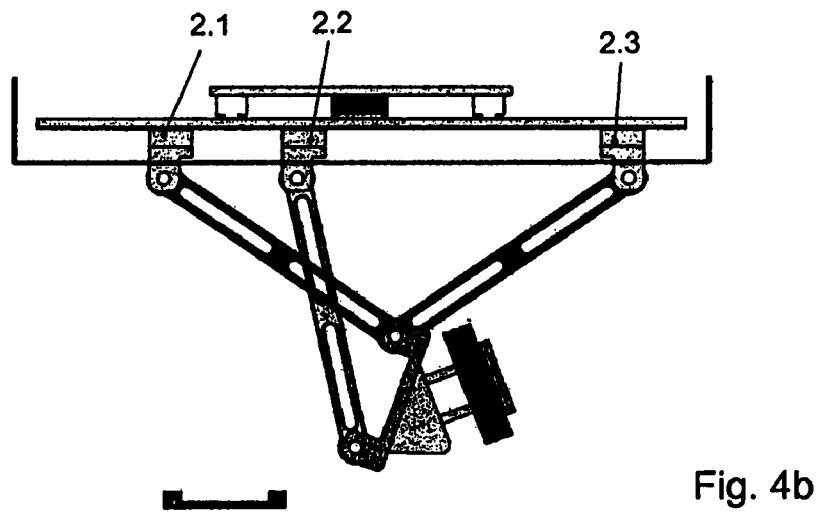
Figure 4C:
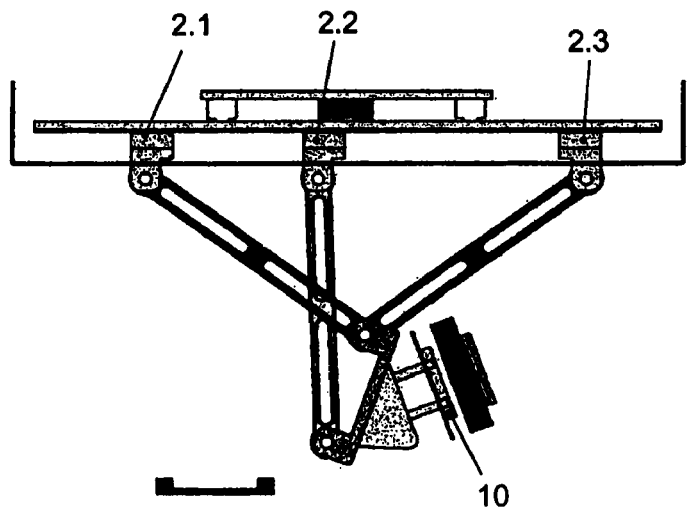

However, in particular, an attachment 16 is also shown on the gripper surface 6 in the exemplary embodiment, with the gripping members 9 being located on an obliquely positioned transfer surface 17. An attachment 16 such as this also makes it possible to take an object 10 from a stack 15 when this stack 15 is located at a position which otherwise cannot be accessed by the gripper 6. This can be seen in particular in FIG. 4a, in which the arm 3.2 is virtually vertical and the carriages 2.1 and 2.3 have been moved as far away from one another as possible. Even if the two carriages 2.1 and 2.3 were now to be moved to the left, thus resulting in the gripper 6 being pivoted further about the joint 5, the gripping members 9, which would then have been rotated to a transfer position, will be arranged too high to allow them to approach the stack 15. This is compensated for by the attachment 16. The gripping members 9 approach the object 10 and remove the object 10 by appropriate control of the movement paths of the carriages 2.1 to 2.3, as shown in FIGS. 4b and 4c.

Figure 4D:
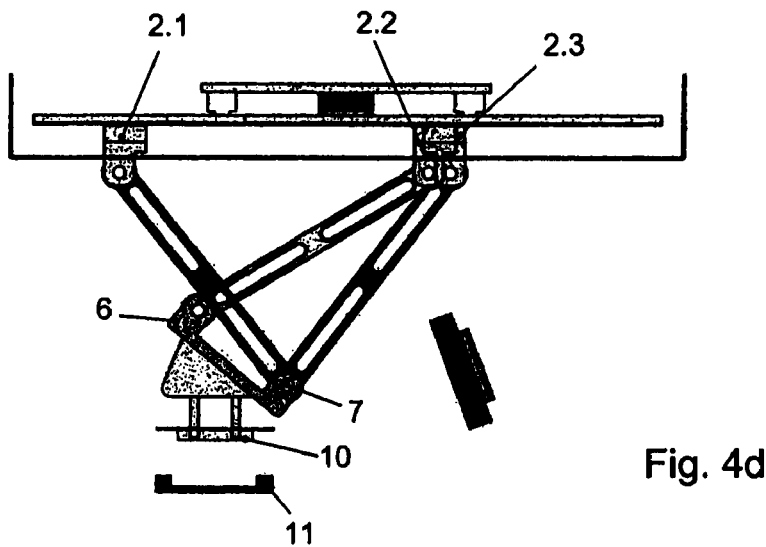
Figure 4E:
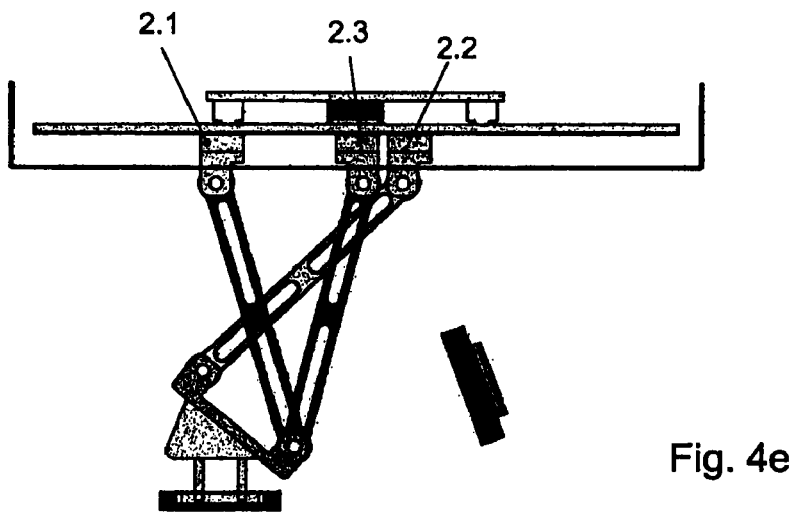
Figure 4F:
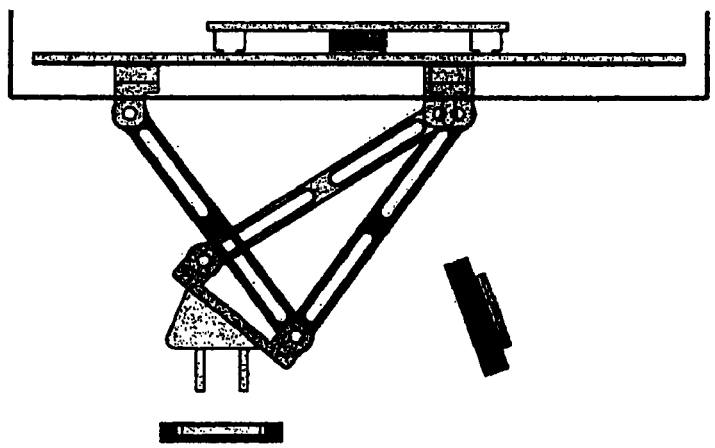

However, in order now to position the object 10 approximately horizontally above the container 11, the gripper 6 must be pivoted in the opposite direction about the joint 7. This is achieved in particular by the carriage 2.2 moving past the carriage 2.3, as shown in FIGS. 4d and 4e. The in-use position as shown in FIG. 4f corresponds to that shown in FIG. 4d.

Figure 5:
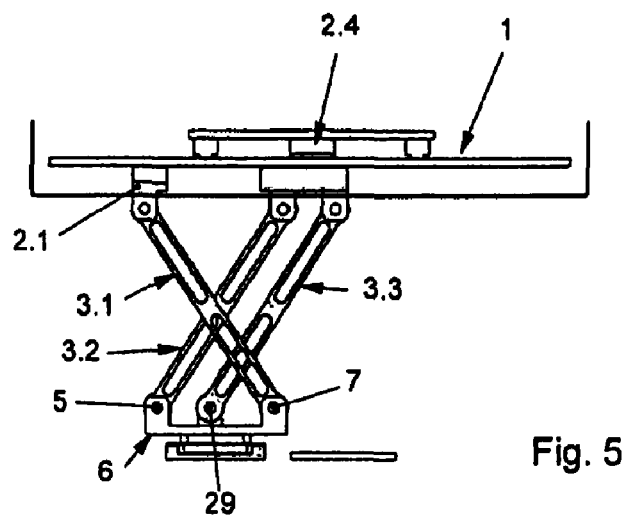
FIGS. 5 to 7 show side views of further exemplary embodiments of a device according to the invention for moving objects.

As shown in FIG. 5, the gripper 6 is connected like a parallelogram via the two arms 3.2 and 3.3 to a common carriage 2.4, while only the one carriage 2.1 is provided for the arm 3.1. For this purpose, however, the arm 3.1 also does not have a common articulation point on the gripper 6 with one of the arms 3.2 or 3.3, and, instead, the arm 3.3 has its own joint 29 with the gripper 6. This joint 29 is located between the joints 5 and 7. It is also feasible, although this is not shown here, for the arm 3.1 to be connected to the joint 29 and for the arm 3.3 to be connected to the joint 7. However, this would increase the physical size of the overall device.

The parallelogram-like connection of the gripper 6 to just one carriage 2.4 and the provision of a dedicated joint 29 admittedly stabilizes the guidance of the gripper 6, but only raising and lowering are possible, and the gripper 6 cannot be pivoted.

Figure 6:
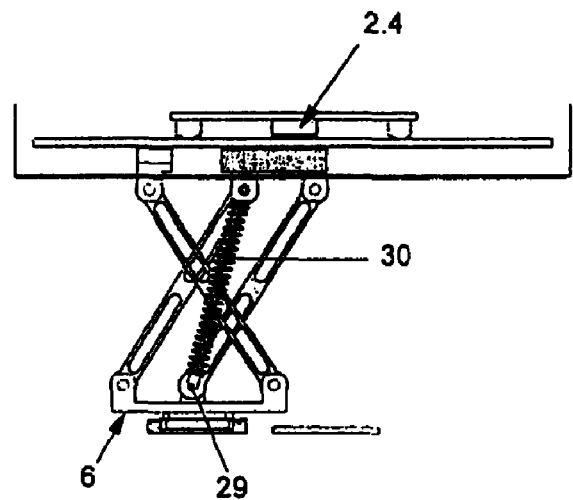

The exemplary embodiment shown in FIG. 6 differs from that shown in FIG. 5 in that the gripper 6 is additionally connected via a force store 30 to the carriage 2.4, with the force store 30 in the present exemplary embodiment being in the form of a helical spring, and being connected to the joint 29. This force store 30 ensures that, in the event of a possible electrical power failure, the gripper 6 will not fall downwards, but is held firmly in its position as predetermined by the force store 30.

Figure 7:
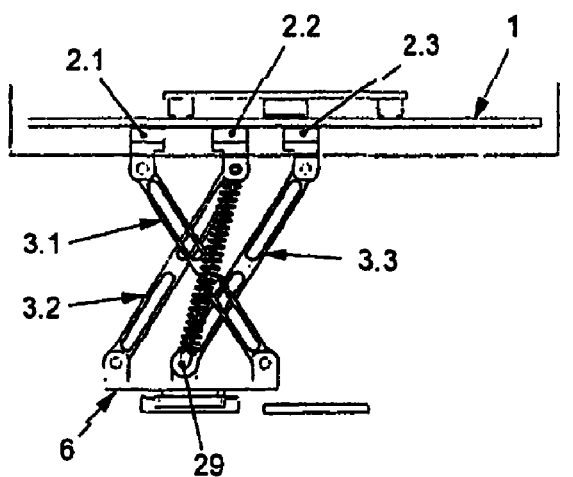

The exemplary embodiment shown in FIG. 7 differs from that shown in FIG. 6 in that each arm 3.1 to 3.3 once again has its own respective carriage 2.1 to 2.3 on the rail 1, instead of the single carriage. This provides the capability for the gripper 6 to be pivoted about the joint 29, for example.

Figure 8:
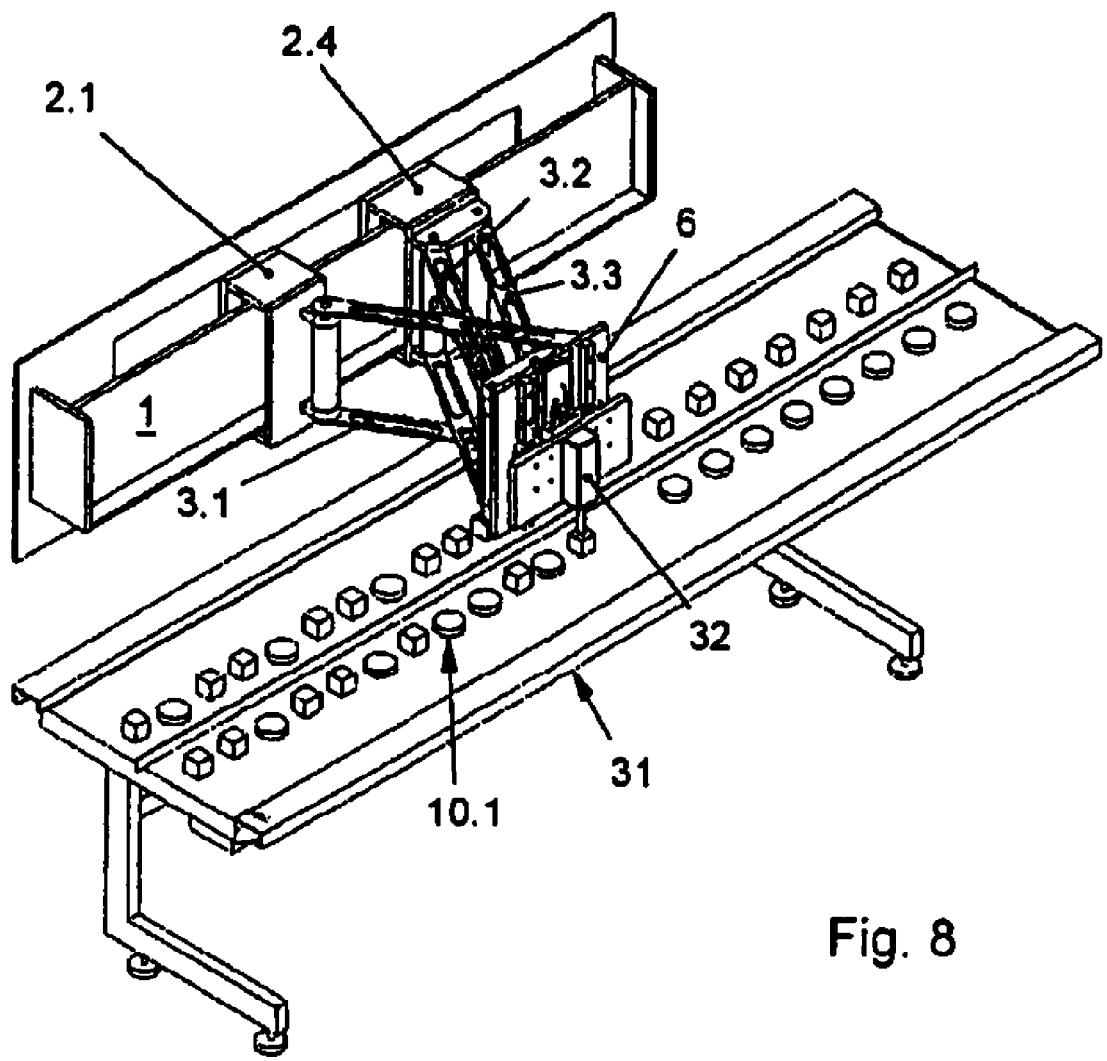
FIG. 8 shows a perspective view of a device according to the invention for handling objects.

As shown in FIG. 8, the device according to the invention is suitable not only for moving objects but also for their handling or treatment. In this case, the objects 10.1 are located on a table 31. The Figure also shows that the entire device cannot just be arranged on a ceiling, working in the vertical, but, for example, it could also be provided on a wall, which is not shown in any more detail, in such a way that the arms 3.1 to 3.3 move horizontally on the carriages 2.1 and 2.4. A corresponding tool 32 is then located on the corresponding gripper 6, which in this case is in the form of a mounting plate.

Figure 9:
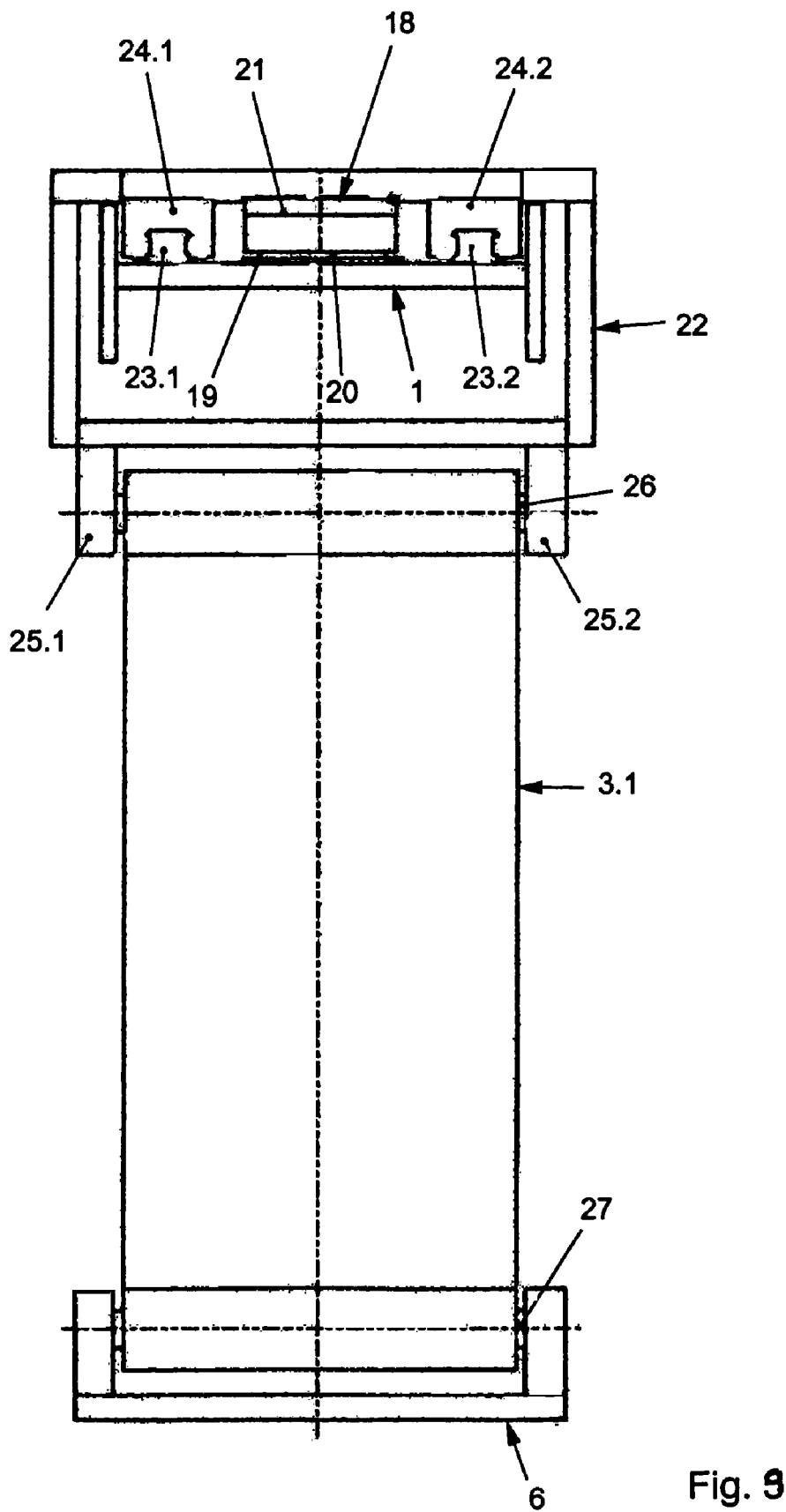
FIG. 9 shows a front view of a further exemplary embodiment of a device according to the invention for moving objects.

According to the present invention, the carriages are intended to be moved with the aid of linear drives. One such drive is illustrated schematically in FIG. 9. In this exemplary embodiment, the linear drive 18 is arranged on the rail 1, with the rail 1 having a cross section in the form of a horizontal I. Permanent-magnet strips 19 of the linear drive 18 are indicated and are located one behind the other on the surface of the rail 1 in a row, with a corresponding pole alignment.

A row of windings 21 which can be energized is located above these permanent magnet strips 19, and separated by an air gap 20. This allows a carriage housing 22, which is in the form of a box, to be moved linearly along the rail 1, with this carriage housing 22, which is in the form of a box, clasping the rail 1. It is supported on both sides of the linear drive 18 against guide rails 23.1 and 23.2, which are clasped by corresponding running rails 24.1 and 24.2.

Two holding lugs 25.1 and 25.2 are provided at the bottom on the carriage housing 22 and a hinge bolt 26, which forms the joint 4.1, passes through them. The arm 3.1 is attached to this hinge bolt 26 and a further hinge bolt 27 is located at the free end of this arm 3.1 and forms the joint 7. The gripper 6 is attached in an articulated manner thereto.

The invention claimed is:

1. A device for handling molds for the production of chocolate articles, comprising a gripper which is arranged on at least three arms which can each be moved along at least one rail on two carriages, the at least three arms include an outer arm on one of the carriages which crosses an inner arm on the other carriage, wherein the outer arm, which crosses the inner arm, forms a common joint with the inner arm and the gripper, and crosses a further outer arm, which forms its own joint with the gripper.

2. The device as claimed in claim 1, wherein the inner and the further outer arm form a parallelogram, and the outer arm crosses this parallelogram.

3. The device as claimed in claim 1, wherein at least one of the outer arms and the inner arm form a jointed connection with one another between the carriages and the gripper.

4. The device as claimed in claim 1, wherein the two carriages can be moved along the same rail.

5. The device as claimed in claim 1, wherein a force store is provided between the carriages and the gripper.

6. The device as claimed in claim 1, wherein a linear drive is arranged between the carriages and the rail.

7. The device as claimed in claim 6, wherein the linear drive is located on the rail.

8. The device as claimed in claim 6, wherein the rail has a horizontal I-shaped cross section.

\* \* \* \* \*